United States Patent
Müller

(10) Patent No.: US 6,988,744 B2
(45) Date of Patent: Jan. 24, 2006

(54) VEHICLE ROLLOVER PROTECTION DEVICE

(75) Inventor: Hartwig Müller, Chemnitz (DE)

(73) Assignees: Innomotive System Europe GmbH, Berneustadt (DE); Daimer Chrysler AG, Stuttgart (DE)

(*) Notice: Subject to any disclaimer, the term of this patent is extended or adjusted under 35 U.S.C. 154(b) by 215 days.

(21) Appl. No.: 10/371,166

(22) Filed: Feb. 20, 2003

(65) Prior Publication Data

US 2003/0178833 A1     Sep. 25, 2003

(30) Foreign Application Priority Data

Feb. 21, 2002   (EP)  ................................. 02003929

(51) Int. Cl.
*B60R 21/13*     (2006.01)

(52) U.S. Cl. .................................................. 280/756

(58) Field of Classification Search ................ 180/274, 180/282; 280/756; B60R 21/13
See application file for complete search history.

(56) References Cited

U.S. PATENT DOCUMENTS

| | | | |
|---|---|---|---|
| 5,236,219 A | * | 8/1993 | Jambor et al. .............. 280/756 |
| 5,626,361 A | * | 5/1997 | Heiner ........................ 280/756 |
| 5,839,758 A | * | 11/1998 | Finch et al. ................ 280/756 |
| 6,296,278 B1 | * | 10/2001 | Zupancic et al. ........... 280/756 |
| 6,334,366 B1 | * | 1/2002 | Schuler et al. .................... 74/2 |
| 6,572,145 B1 | * | 6/2003 | Guillez et al. .............. 280/756 |

FOREIGN PATENT DOCUMENTS

| | | | |
|---|---|---|---|
| DE | 19712955 A1 | * | 10/1998 |
| DE | 19734963 A1 | * | 2/1999 |
| DE | 10013376 C1 | * | 6/2001 |
| DE | 10044926 C1 | * | 9/2001 |
| DE | 10051882 A1 | * | 9/2001 |
| EP | 965470 A1 | * | 12/1999 |
| EP | 1 028 050 A2 | | 8/2000 |
| EP | 1033291 A2 | * | 9/2000 |
| EP | 1038735 A2 | * | 9/2000 |
| JP | 09240402 A | * | 9/1997 |

OTHER PUBLICATIONS

European Search Report, Aug. 7, 2002, 02003929.3-1523, ISE Innomotive Systems Europe GmbH.

* cited by examiner

*Primary Examiner*—Paul N. Dickson
*Assistant Examiner*—Laura B. Rosenberg
(74) *Attorney, Agent, or Firm*—Armstrong Teasdale LLP

(57) ABSTRACT

A rollover protection device for the passengers of a vehicle having a body and a lateral bulkhead includes a structural unit adapted to be mounted on one side of the vehicle body lateral bulkhead. The structural unit includes at least one extendible rollover bar, and a module beam being connectable in a force transmitting fashion with the lateral bulkhead and the vehicle body. The module beam extends crosswise to the longitudinal direction of the vehicle in an upper region of the lateral bulkhead, and at least one force transmission member contains the at least one rollover bar. The at least one force transmission member supports the module beam at the vehicle body bottom.

16 Claims, 2 Drawing Sheets

VEHICLE ROLLOVER PROTECTION DEVICE

CROSS REFERENCE TO RELATED APPLICATIONS

This application claims the benefit of European Patent Application 02003929.3 filed Feb. 21, 2002.

BACKGROUND OF THE INVENTION

The present invention relates to a protection device for passengers of automobiles, and, more particularly, to vehicle rollover protection devices for passengers.

Protection features to protect passengers in vehicle rollover accidents are known. In at least one known type of rollover protection device, two separated lateral bulkheads are provided in vehicles, and a structural unit in the form of a module beam is inserted therebetween. In a vehicle rollover, the module beam constitutes the main force transmitting component and is loaded in case of a crash not only by bending stress but also by torsion stress and for these reasons has to be designed very robustly.

DE U 201 03 001 (PCT/EP 01/06515) discloses a module beam made of fiber composite plastic material that stiffens a vehicle body and a lateral bulkhead. A structural unit is therefore employed utilizing a single lateral bulkhead, and weight is saved significantly by the material choice compared to a conventional metal sheet construction.

DE 41 00 506 A discloses a rollover protection device including a rigid metallic guiding frame which receives rollover bars and which is completed by covers associated with the lower parts of the rollover bar and the driving mechanisms and control means for the rollover bars. The guiding frame is mounted at a lateral bulkhead and is fixed at both sides thereof by threaded connections in the vehicle body. Resilient rubber bearings are provided between the vehicle body bottom and the guiding frame. This construction, however, results in undesirably heavy weight for the protection device, and in case of a vehicle rollover, forces are introduced into the vehicle body predominantly only sidewardly.

EP 1 028 050 A discloses a rollover protection device including a base plate of a structural unit that constitutes a main carrying element and at the same time a lateral bulkhead in the vehicle body. The base plate has respective hollow lateral profile beams in the upper and lower base plate portions. The rollover bars are guided at the upper profile beam and at the front side (relative to a vehicle travelling direction) of the base plate. The rollover bars are received by enforcing blocks secured to the upper profile beam. Each of the enforcing blocks is prolonged downwardly by an inclined covering wall, the lower end of which is fixed at the lower profile beam of the base plate. Guiding elements of the rollover bars are inserted from above into the lower profile beam. All components of the structural units are extruded light metal profiles. This results in a heavy weight, and the vehicle body bottom is not used to take up forces from the protection device.

BRIEF DESCRIPTION OF THE INVENTION

In accordance with an exemplary embodiment of the present invention, a vehicle rollover protection device is provided of a lesser weight than known protection devices while maintaining safety standards for a rollover crash.

In one aspect, and in accordance with an exemplary embodiment of the invention, a rollover protection device for the passengers of a vehicle is provided. The vehicle includes a body and a lateral bulkhead, and the device comprises a structural unit adapted to be mounted on one side of the vehicle body lateral bulkhead. The structural unit comprises at least one extendible rollover bar, and a module beam being connectable in a force transmitting fashion with the lateral bulkhead and the vehicle body. The module beam extends crosswise to the longitudinal direction of the vehicle in an upper region of the lateral bulkhead, and at least one force transmission member contains the at least one rollover bar. The at least one force transmission member supports the module beam at the vehicle body bottom.

In another aspect, and in accordance with an exemplary embodiment of the invention, a rollover protection device for the passengers of a vehicle is provided. The vehicle includes a body, and the device comprises a structural unit adapted to be mounted on one side of the vehicle body. The structural unit comprises at least one extendible rollover bar, and a module beam extending crosswise to the longitudinal direction of the vehicle. A cassette housing contains the at least one rollover bar, and the cassette housing supports the module beam at the vehicle body bottom. A lateral bulkhead is coupled to the cassette housing and to the vehicle body. The module beam is coupled in a force transmitting fashion to the lateral bulkhead.

In another aspect, and in accordance with an exemplary embodiment of the invention, a rollover protection device for the passengers of a vehicle is provided. The vehicle includes a body having a bottom including a hollow lateral beam structure. The device comprises a structural unit adapted to be mounted on one side of the vehicle body, and the structural unit comprises at least one extendible rollover bar. A module beam is connectable in a force transmitting fashion with the lateral bulkhead and the vehicle body, and the module beam extends crosswise to the longitudinal direction of the vehicle in an upper region of the lateral bulkhead. A cassette housing contains the at least one rollover bar, and the cassette housing supports the module beam at the vehicle body bottom in the vicinity of the hollow lateral beam structure.

DETAILED DESCRIPTION OF THE INVENTION

Figure 1:
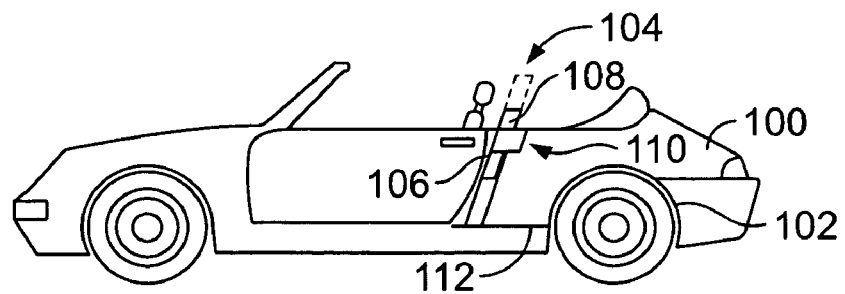
FIG. 1 is a schematic side view of an exemplary vehicle containing a built-in rollover protection device.

FIG. 1 illustrates an exemplary vehicle in the form of a convertible car 100 (two-seater or four-seater) including a vehicle body 102. In case of a vehicle rollover crash, a rollover protection device 104 for the passengers is built-in behind the vehicle seats at a lateral bulkhead 106. In an exemplary embodiment, the protection device 104 includes two rollover bars 108 which are provided side-by-side in a lateral direction of the vehicle and behind the vehicle seats.

The rollover bars can be extended in a conventional manner from a retracted passive position illustrated in FIG. 1 to an extended crash position (shown in phantom in FIG. 1). The protective device 104 includes a structural unit 110, described below, which either is installed at the lateral bulkhead 106 of the vehicle body 102 or is installed together with the lateral bulkhead 106 in the vehicle body 102. The protection device 104 is connected to the vehicle body bottom 112 in a force transmitting manner or at least is supported at the vehicle body bottom 112, respectively, as explained below.

Depending upon the vehicle type, the lateral bulkhead 106 may be a fixed component of the vehicle body 102 to which the structural unit 110 of protection device 104 is mounted. Alternatively the lateral bulkhead 106 may be a component of the structural unit 110 and is mounted together with the structural unit 110 to the vehicle body 102. In any case, the lateral bulkhead 106 need not necessarily be a sheet metal wall with stiffening structures as in conventional devices. The lateral bulkhead even may be a molded part of a fiber composite plastic material described below. In the illustrated embodiment, the structural unit 110 of the protection device 104 is installed at the rear side of the lateral bulkhead 106 facing the rear end of the vehicle 100, although it is recognized that the structural unit 110 could likewise be installed elsewhere without departing from the scope of the present invention.

It is understood that the invention may be readily adapted for different types of vehicles. For example, and according to the design of the respective vehicle type, the protection device 104 may be built-in essentially vertical or inclined, behind the front seats, or behind the rear seats, respectively. While the invention is described and illustrated in the context of convertible car 100, it is recognized that the benefits of the invention accrue generally to other makes and types of vehicles. Convertible car 100 is therefore described herein for purposes of illustration rather than limitation, and application of the invention is therefore not intended to be limited to any particular type of vehicle.

Figure 2:
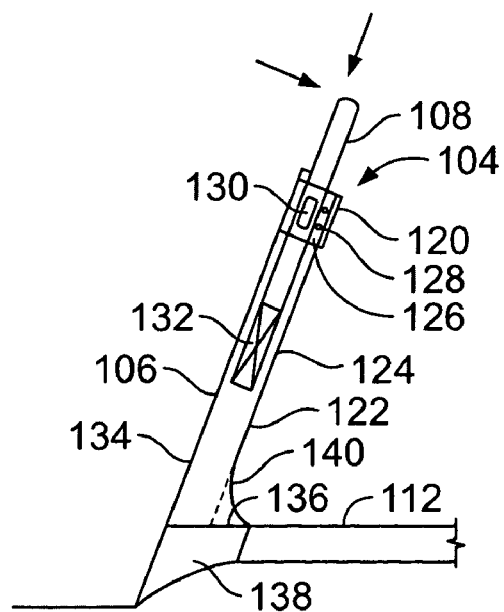
FIG. 2 is a schematic side view of the rollover protection device shown in FIG. 1.

FIG. 2 illustrates rollover protection device 104 mounted, for example, at the rear side of the lateral bulkhead 106 (i.e., at the side facing the rear end of the vehicle). In an alternative embodiment, the protection device 104 is installed elsewhere, such as, for example, at the front side of the lateral bulkhead 106. In an exemplary embodiment, the protection device 104 includes a module beam 120 fabricated from a fiber composite plastic material. The module beam 120 is located in an upper region of the lateral bulkhead 106 and extends crosswise relative to the longitudinal direction of the vehicle. The module beam 120 both is connected in a force transmitting fashion with the lateral bulkhead 106 and also to the side parts of the vehicle body 102. Together with the lateral bulkhead 106, the module beam 120 forms a receptacle and a guidance for the rollover bars 108 which extend downwardly beyond the module beam 120.

The module beam 120 additionally is supported by a force transmission member 122 directly against the vehicle body bottom 112. Since the module beam 120 is supported in a force transmitting manner via at least one force transmission member 122 directly at the vehicle body bottom 112, the module beam 120 will not be subjected to a significant torsion load in case of a rollover crash. The loads which tend to cause torsion of the module beam 120 to the contrary are introduced directly via the force transmission member 122 into the vehicle body bottom 112. Consequently, the module beam 120 can have a more fragile design such that more module beam weight can be saved than the additional weight of the force transmission member 122. Moreover, the force transmission member 122 additionally stiffens the structural unit 110 of protection device 104 and the vehicle 100. As such, the protection device 104 is well suited for the vehicle body 102 of a convertible car 100 as illustrated in FIG. 1, which by nature has the tendency to more easily distort. As noted above, however, it is recognized that the benefits of the invention accrue to other types of vehicles in addition to convertible cars.

In an exemplary embodiment, the force transmission member 122 includes at least one cassette or cassette-type housing 124 made from a fiber composite plastic material in order to significantly save weight in the assembly. In one embodiment, housing 124 is fabricated from endless glass fibers in a matrix of polypropylene with the main fiber direction extending from top to bottom. The respective main fiber direction should extend substantially in the longitudinal direction of the molded part, and the glass fibers may be contained in woven fabrics or in unidirectional fabrics. Cassettes 124 may be formed into arbitrary cross-sectional forms and contours in a simple fashion while providing immense strength in an extremely lightweight fashion. As explained below, the cassettes 124 can be formed with minimum material volume with a continuous U-shaped cross-section adapted to the expected loads. In the event of a rollover accident, cassette 124 takes up the forces in large areas, and transmits and introduces the forces into the vehicle body bottom 112.

In an exemplary embodiment, the cassette 124 is introduced from below through an opening 126 into the module beam 120 and is, for example, at a location 128 connected in a force transmitting fashion to the module beam 120 and/or the lateral bulkhead 106. The cassette 124 serves in this region to slidably guide the rollover bar 108 and can contain components of a latching mechanism 130 described below. The cassette 124 takes up the forces directly at the locations where they are transmitted from the rollover bar 108. In order to achieve the same force transmitting conditions for each rollover bar 108, each of the rollover bars is covered by a cassette 124.

Conventional latching devices 130 may be provided inside the module beam 120, and particularly inside the upper end portion of the cassette 124. The latching devices 130 serve to lock the extended rollover bars 108 in the crash position. The interior of the cassette 124 forms a movement guide for the respective rollover bar 108. In the interior of the cassette 124 conventional drive components and sensorial components 132 for extending the rollover bar 108 may be received in a protected fashion. Furthermore, the cassette 124 is connected to the lateral bulkhead 106, e.g. at fixation locations 134. Expediently, the cassette 124, furthermore, also is connected to the vehicle body bottom 112, for example, in fixation locations 136. The vehicle body bottom 112 may be elevated in the support region of the cassette 124 and even may have an integrated hollow lateral beam structure 138. A particularly improved force transmission into the vehicle can be achieved when the vehicle body bottom is provided with a hollow lateral beam structure in the support region for the cassette or the cassette-type housing 124. Such a lateral beam structure even may be expedient for other vehicle related reasons. The hollow lateral beam structure further facilitates use of a short cassette or cassette-type housing.

In an exemplary embodiment, the cassette 124 has a continuous U-shaped cross-section (indicated in FIG. 4) which in one embodiment extends according to FIG. 2 substantially with uniform height from the module beam 120 to the vehicle bottom 112 (as shown in phantom in FIG. 2). In an alternative embodiment, the U-shaped cross-section extends in the lower portion of the cassette 124 with increasing height in order to define a marked foot portion 140 serving to create a stable support. In case of a rollover crash, the foot portion 140 transmits forces via large areas and offers a stable support of the entire structural unit 110 of protection device 104 at the vehicle bottom 112.

Figure 3:
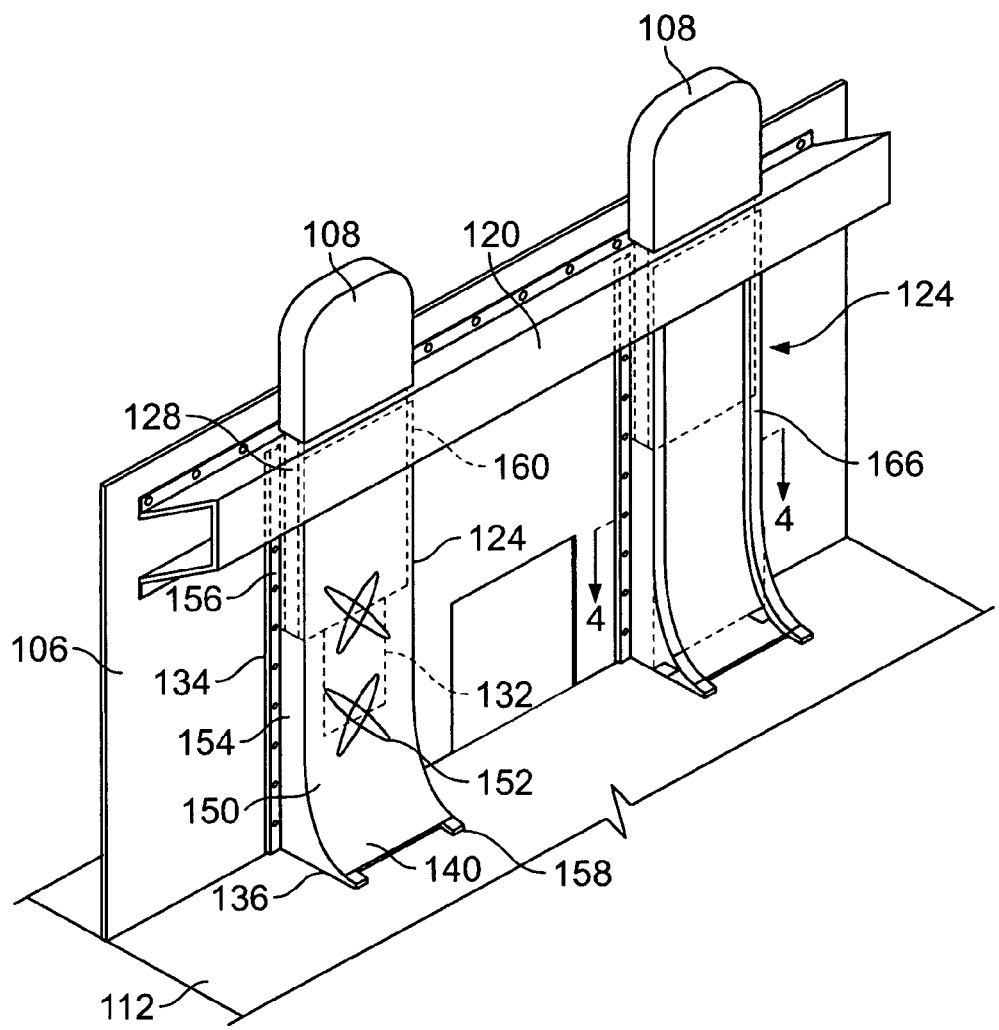
FIG. 3 is a perspective schematic view of a part of a vehicle body with a built-in rollover protection device shown in FIGS. 1 and 2, in a viewing direction from the rear end of the vehicle.

In the perspective view illustrated in FIG. 3 both cassettes 124 include a respective foot portion 140. The aforementioned embodiments of the cassettes 124 with continuous height is indicated by dotted lines on the right side in FIG. 3.

Each of the cassettes 124 has a substantially even rear wall portion 150 which has a relatively small wall thickness and for that reason in an illustrative embodiment is stiffened by integrated beads 152 in order to avoid buckling deformations in the relatively thin walled rear wall portion. While beads 152 are illustrated in FIG. 1 arranged in an X-shaped configuration, it is contemplated that other shapes and arrangements of stiffening beads and features may likewise be employed in further and/or alternative embodiments.

Furthermore, in an exemplary embodiment, the cassette 124 includes U-leg wall portions 154 at its side and fixation flanges 156 formed at the portions 154. In an alternative embodiment, several single fixation domes (not shown) may be provided in the fixation locations 134 with the lateral bulkhead 106. The cassette 124 may be fixed comfortably by means of the fixation flanges 156 or the fixation domes at the lateral bulkhead in a structurally simple way. The foot portion 140 includes fixation tabs 158 which extend to the rear in an illustrative embodiment. An upper end 160 of the cassette 124 is fixed inside the module beam 120.

In order to rationally adapt the assembly for a desired application in a particular vehicle type, the cassette 124 may also be fixed via threaded connections, clinching connections, rivet connections, welding, gluing, and the like familiar to those in the art. It is understood that such connection principles may be selectively combined with each other in various embodiments of the invention.

Figure 4:
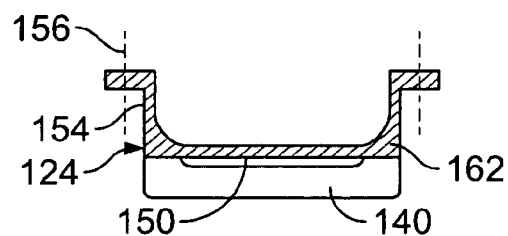
FIG. 4 a schematic cross sectional view of the rollover protection device taken along line 4—4 in FIG. 3.

As illustrated in FIG. 4, and according to an illustrative embodiment, a larger material volume is provided in the corner sections 162 of the U-shaped cross-section of the cassette 124. As such, integrated pressure struts are formed in the cassette 124, while the wall thickness in the rear wall portion 150 is relatively thin. Additionally, the U-leg wall portions 154 may be formed with larger wall thickness than the wall thickness in the rear wall portion 150. In various embodiments, the cassette 124 may be formed along its height extension from the module beam 120 to the vehicle body bottom 112 with varying wall thicknesses, e.g. in adaptation to bending moments. Depending on the respective application the wall thickness may be larger in the region of the module beam 120 than close to the bottom, or vice-versa, or even in-between.

FIG. 3 illustrates in phantom an embodiment in which both cassettes 124 or the cassette-type housings are connected to one another in a lateral direction by connecting struts 164. In certain applications, however, added weight of struts 164 may render the struts undesirable and struts 164 may therefore be omitted.

The cassette 124 illustrated in FIG. 3 on the right side is designed as a possible alternative and/or further embodiment such that the lateral edges of the rear wall portion 150 form marked longitudinal ribs 166, i.e. integrated pressure struts or stiffening ribs.

Relative to known rollover protection devices, the cassettes or the cassette-type housings 124, respectively, which are integrated in a force transmitting fashion between the module beam 120, the lateral bulkhead 106 and the vehicle body bottom 112, define additional load transmitting paths into the vehicle bottom 112 and into the lateral bulkhead 106, for an additional load transmission during a vehicle rollover. This structure also markedly stiffens the vehicle body for normal cruising conditions. The forces transmitted via those additional load transmitting paths avoid torsion stresses in the module beam 120, such that module beam 120 only will be loaded by bending stresses. Module beam 120, which defines a main component of the structural unit 110, may therefore be formed as a relatively fragile and relatively lightweight member, and the weight saving which is achievable with the module beam 120 is larger than the additional weight of the cassette 124 or the cassette-type housings, respectively. By fabricating the rollover bars 108, the module beam 120 and the cassettes 124 from fiber composite plastic materials, several kilograms can be saved in comparison with a conventional construction made of metal or of extruded light metal profiles, while providing substantially equal or even better protection in the event of a vehicle rollover.

The cassette 124 may be formed from fiber composite plastic material by using prepregs and in a hot pressing process familiar to those in the art. Consequently, a large degree of freedom for the forms or contours of the component parts is provided. All structural features needed for the different intended functions of the cassette may be formed or molded in one construction. The wall thickness of the cassette may be selected uniformly in height direction. Alternatively, it is possible to vary the wall thickness in height direction (from the module beam to the bottom) in order to optimally adapt the cassette to the load conditions and such that an optimum load transmission is assured with minimum material volume.

Additionally, in an embodiment when the cassette 124 faces to the trunk of the vehicle, it may be already pretreated during the molding process and/or may be provided with an overlay which is similar to or equal to the lining or surface trimming in the trunk. The overlay may be formed such that it dissipates energy to protect the rollover system against damages resulting from hard impacts of objects stored in the trunk. Further, in an embodiment wherein the cassette is mounted such that it is situated at the front side of the lateral bulkhead, it simultaneously could serve as a carrier for the rear seat backrest or even could form the rear seat backrest to save weight and mounting space.

While the invention has been described in terms of various specific embodiments, those skilled in the art will recognize that the invention can be practiced with modification within the spirit and scope of the claims.

What is claimed is:

1. A rollover protection device for passengers of a vehicle, the vehicle including a body and a lateral bulkhead, said device comprising:
   a structural unit adapted to be mounted on one side of a lateral bulkhead of a vehicle, said structural unit comprising:
   at least one extendible rollover bar;
   a module beam being connectable in a force transmitting fashion with the lateral bulkhead and the vehicle body, said module beam extending crosswise to a longitudinal direction of the vehicle in an upper region of the lateral bulkhead; and at least one force transmission member containing said at least one rollover bar, said at least one force transmission member supporting said module beam at a vehicle body bottom, said at least one force transmission member comprising a cassette mounted to said module beam, to said lateral bulkhead, and to the vehicle body bottom;

wherein said cassette is fabricated from a fiber composite plastic material with a U-shaped cross-section comprising opposite legs, each of said legs comprising a fixation flange, said U-shaped cross section continuously extending from said module beam to the vehicle body bottom, said at least one force transmission member secured to the lateral bulkhead via said fixation flanges;

wherein the U-shaped cross section includes a rear wall interconnecting opposite corner sections and legs extending from the corner sections, a wall thickness of said leg portions and said corner sections of the U-shaped cross-section greater than a thickness of said rear wall.

2. A protection device in accordance with claim 1, said at least one force transmission member comprising a foot portion attached to the vehicle bottom.

3. A protection device in accordance with claim 1, said at least one force transmission member comprising a cassette extending to an inside of said module beam and toward interior connection locations thereof.

4. A protection device in accordance with claim 1, wherein said U-shaped cross-section includes a rear wall having longitudinal edges, said longitudinal edges formed as protruding ribs.

5. A protection device in accordance with claim 1, wherein the U-shaped cross section includes a rear wall portion provided with molded inforcing beads.

6. A protection device in accordance with claim 5 wherein said beads are arranged in the shape of an X.

7. A protection device in accordance with claim 1, said module beam, said at least one force transmission member, and said at least one rollover bar fabricated from endless glass fibers in a matrix of polypropylene.

8. A protection device in accordance with claim 1, at least two of said module beam, said at least one force transmission member, and said at least one rollover bar fiber fabricated from a composite plastic material.

9. A rollover protection device for passengers of a vehicle, the vehicle including a body and a lateral bulkhead, said device comprising:

a structural unit adapted to be mounted on one side of a lateral bulkhead of a vehicle, said structural unit comprising:

at least one extendible rollover bar;

a module beam being connectable in a force transmitting fashion with the lateral bulkhead and the vehicle body, said module beam extending crosswise to a longitudinal direction of the vehicle in an upper region of the lateral bulkhead; and at least one force transmission member containing said at least one rollover bar, said at least one force transmission member supporting said module beam at a vehicle body bottom, said at least one force transmission member comprising a cassette mounted to said module beam, to said lateral bulkhead, and to the vehicle body bottom;

wherein said cassette is fabricated from a fiber composite plastic material with a U-shaped cross-section comprising opposite legs, each of said legs comprising a fixation flange, said U-shaped cross section continuously extending from said module beam to the vehicle body bottom, said at least one force transmission member secured to the lateral bulkhead via said fixation flanges; and wherein said at least one force transmission member comprises a cassette, a wall thickness of said cassette varying in a direction from the module beam towards the vehicle body bottom.

10. A protection device in accordance with claim 9, said at least one force transmission member comprising a foot portion attached to the vehicle bottom.

11. A protection device in accordance with claim 9, said at least one force transmission member comprising a cassette extending to an inside of said module beam and toward interior connection locations thereof.

12. A protection device in accordance with claim 9, wherein said U-shaped cross section includes a rear wall having longitudinal edges, said longitudinal edges formed as protruding ribs.

13. A protection device in accordance with claim 9, wherein the U-shaped cross section includes a rear wall portion provided with molded enforcing beads.

14. A protection device in accordance with claim 13 wherein said beads are arranged in the shape of an X.

15. A protection device in accordance with claim 9, said module beam, said at least one force transmission member, and said at least one rollover bar fabricated from endless glass fibers in a matrix of polypropylene.

16. A protection device in accordance with claim 9, at least two of said module beam, said at least one force transmission member, and said at least one rollover bar fiber fabricated from a composite plastic material.

* * * * *

UNITED STATES PATENT AND TRADEMARK OFFICE
CERTIFICATE OF CORRECTION

PATENT NO.        : 6,988,744 B2                                    Page 1 of 1
APPLICATION NO. : 10/371166
DATED             : January 24, 2006
INVENTOR(S)       : Hartwig Müeller It is certified that error appears in the above-identified patent and that said Letters Patent is hereby corrected as shown below:

<u>IN THE ASSIGNEES</u>

Delete "Innomotive System Europe GmbH, Berneustadt (DE); Daimler Chrysler AG, Stuttgart (DE)" and insert therefor -- ISE Innomotive Systems Europe GmbH, Bergneustadt (DE); Daimler Chrysler AG, Stuttgart (DE) --.

Signed and Sealed this

Fifteenth Day of August, 2006

JON W. DUDAS
*Director of the United States Patent and Trademark Office*